(12) United States Patent
Waxman et al.

(10) Patent No.: US 9,614,890 B2
(45) Date of Patent: Apr. 4, 2017

(54) ACQUIRING AND CORRELATING WEB REAL-TIME COMMUNICATIONS (WEBRTC) INTERACTIVE FLOW CHARACTERISTICS, AND RELATED METHODS, SYSTEMS, AND COMPUTER-READABLE MEDIA

(71) Applicant: Avaya Inc., Basking Ridge, NJ (US)

(72) Inventors: Harvey Waxman, Holmdel, NJ (US); John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/955,023

(22) Filed: Jul. 31, 2013

(65) Prior Publication Data

US 2015/0039687 A1 Feb. 5, 2015

(51) Int. Cl.
  G06F 15/16 (2006.01)
  H04L 29/08 (2006.01)
  H04L 29/06 (2006.01)

(52) U.S. Cl.
  CPC .......... *H04L 67/02* (2013.01); *H04L 65/1006* (2013.01); *H04L 65/1053* (2013.01); *H04L 65/608* (2013.01); *H04L 67/141* (2013.01)

(58) Field of Classification Search
  CPC . H04L 65/1006; H04L 67/02; H04L 65/1016; H04L 12/1403; H04L 51/04; H04M 15/57; H04M 15/59; H04M 1/656
  See application file for complete search history.

(56) References Cited

U.S. PATENT DOCUMENTS 6,714,967 B1 3/2004 Horvitz
7,107,316 B2 9/2006 Brown et al.
(Continued)

FOREIGN PATENT DOCUMENTS

EP 1615386 A1 1/2006
EP 2529316 A2 12/2012
(Continued)

OTHER PUBLICATIONS

Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.
(Continued)

*Primary Examiner* — Tauqir Hussain
*Assistant Examiner* — Kamran Mohammadi
(74) *Attorney, Agent, or Firm* — Sheridan Ross P.C.

(57) ABSTRACT

Embodiments include acquiring and correlating Web Real-Time Communications (WebRTC) interactive flow characteristics, and related methods, systems, and computer-readable media. In one embodiment, a method for acquiring and correlating characteristics of WebRTC interactive flows comprises receiving, by an acquisition agent of a WebRTC client executing on a computing device, a peer connection initiation dialog for establishing a WebRTC interactive flow. The method further comprises determining, by the acquisition agent, one or more characteristics of the WebRTC interactive flow based on the peer connection initiation dialog. The method additionally comprises receiving, by a correlation agent, the one or more characteristics of the WebRTC interactive flow from the acquisition agent, and storing the one or more characteristics of the WebRTC interactive flow. The method also comprises correlating, by the correlation agent, one or more stored characteristics, and generating, by the correlation agent, one or more interaction records based on the correlating.

17 Claims, 5 Drawing Sheets

(56) References Cited

U.S. PATENT DOCUMENTS

| | | |
|---|---|---|
| 7,145,898 B1 | 12/2006 | Elliott |
| 7,266,591 B1 | 9/2007 | Johnston |
| 7,379,993 B2 | 5/2008 | Valdes et al. |
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,300,632 B2 | 10/2012 | Davis et al. |
| 8,467,308 B2 | 6/2013 | Johnston |
| 8,494,507 B1 | 7/2013 | Tedesco et al. |
| 8,601,144 B1 | 12/2013 | Ryner |
| 8,605,711 B1 | 12/2013 | Sinnreich et al. |
| 8,606,950 B2 | 12/2013 | Glatron et al. |
| 8,693,392 B2 | 4/2014 | Cooper et al. |
| 8,695,077 B1* | 4/2014 | Gerhard .............. H04L 63/0815 726/8 |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1* | 10/2014 | Phelps .................. H04M 15/39 370/401 |
| 8,867,731 B2 | 10/2014 | Lum et al. |
| 2002/0161685 A1 | 10/2002 | Dwinnell |
| 2003/0112766 A1 | 6/2003 | Riedel et al. |
| 2003/0120599 A1 | 6/2003 | Agboatwalla et al. |
| 2003/0131245 A1 | 7/2003 | Linderman |
| 2003/0188193 A1 | 10/2003 | Venkataramappa |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrmann |
| 2004/0216173 A1 | 10/2004 | Horoszowski et al. |
| 2005/0084082 A1 | 4/2005 | Horvitz et al. |
| 2005/0177380 A1 | 8/2005 | Pritchard et al. |
| 2006/0104526 A1 | 5/2006 | Gringeler et al. |
| 2006/0155814 A1 | 7/2006 | Bennett et al. |
| 2006/0159063 A1 | 7/2006 | Kumar |
| 2006/0200855 A1 | 9/2006 | Willis |
| 2006/0230438 A1 | 10/2006 | Shappir et al. |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0127137 A1 | 5/2008 | Becker et al. |
| 2008/0162642 A1 | 7/2008 | Bachiri et al. |
| 2008/0192646 A1 | 8/2008 | Song et al. |
| 2008/0270541 A1 | 10/2008 | Keener et al. |
| 2009/0070477 A1 | 3/2009 | Baum et al. |
| 2009/0094684 A1 | 4/2009 | Chinnusamy et al. |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0118700 A1 | 5/2010 | Blum et al. |
| 2010/0246571 A1 | 9/2010 | Geppert et al. |
| 2011/0102930 A1 | 5/2011 | Johnston et al. |
| 2011/0206013 A1 | 8/2011 | Aramoto et al. |
| 2011/0238862 A1 | 9/2011 | Chaturvedi et al. |
| 2012/0001932 A1 | 1/2012 | Burnett et al. |
| 2012/0079031 A1 | 3/2012 | Matthews et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2013/0002799 A1 | 1/2013 | Mock |
| 2013/0078972 A1 | 3/2013 | Levien et al. |
| 2013/0091286 A1 | 4/2013 | Spencer |
| 2013/0138829 A1 | 5/2013 | Bulava |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095724 A1 | 4/2014 | Yoakum et al. |
| 2014/0095731 A1 | 4/2014 | Carey et al. |
| 2014/0108594 A1* | 4/2014 | Siegel et al. .................. 709/217 |
| 2014/0126708 A1* | 5/2014 | Sayko .................... H04M 11/00 379/93.01 |
| 2014/0126714 A1 | 5/2014 | Sayko |
| 2014/0126715 A1 | 5/2014 | Lum et al. |
| 2014/0143823 A1 | 5/2014 | Manchester et al. |
| 2014/0149512 A1 | 5/2014 | Leitch |
| 2014/0161237 A1 | 6/2014 | Tolksdorf |
| 2014/0201820 A1 | 7/2014 | Li et al. |
| 2014/0219167 A1 | 8/2014 | Santhanam et al. |
| 2014/0222894 A1 | 8/2014 | Gangadharan et al. |
| 2014/0222930 A1 | 8/2014 | Gangadharan et al. |
| 2014/0223452 A1 | 8/2014 | Santhanam et al. |
| 2014/0237057 A1* | 8/2014 | Khodorenko ................ 709/206 |
| 2014/0241215 A1 | 8/2014 | Massover et al. |
| 2014/0244235 A1 | 8/2014 | Michaelis |
| 2014/0245143 A1 | 8/2014 | Saint-Marc |
| 2014/0258822 A1 | 9/2014 | Li et al. |
| 2014/0269326 A1 | 9/2014 | Westin et al. |
| 2014/0270104 A1* | 9/2014 | O'Connor ....................... 379/85 |
| 2014/0280734 A1 | 9/2014 | Chaturvedi et al. |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1 | 9/2014 | Casey et al. |
| 2014/0282903 A1 | 9/2014 | Singh et al. |
| 2014/0324979 A1 | 10/2014 | Gao et al. |
| 2014/0325078 A1 | 10/2014 | Shan et al. |
| 2014/0344169 A1 | 11/2014 | Phelps et al. |
| 2014/0348044 A1 | 11/2014 | Narayanan et al. |
| 2014/0365676 A1 | 12/2014 | Yoakum |
| 2014/0379931 A1 | 12/2014 | Gaviria |
| 2015/0002614 A1 | 1/2015 | Zino et al. |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0026473 A1 | 1/2015 | Johnston et al. |
| 2015/0036690 A1* | 2/2015 | Pastro .................. H04L 65/1003 370/401 |
| 2015/0039760 A1 | 2/2015 | Yoakum |
| 2015/0052067 A1 | 2/2015 | Thiyagarajan et al. |
| 2015/0180825 A1 | 6/2015 | Ren et al. |

FOREIGN PATENT DOCUMENTS

| | | |
|---|---|---|
| GB | 2295747 A | 6/1996 |
| GB | 2468758 A | 9/2010 |
| GB | 2468759 A | 9/2010 |
| GB | 2517833 A | 3/2015 |
| JP | 2002207683 A | 7/2002 |
| JP | 2002374318 A | 12/2002 |
| JP | 2005346556 A | 12/2005 |
| JP | 2006050407 A | 2/2006 |
| JP | 2011504665 A | 2/2011 |
| WO | 2014060008 A1 | 4/2014 |
| WO | 2014123738 A1 | 8/2014 |
| WO | 2014190094 A1 | 11/2014 |
| WO | 2015032277 A1 | 3/2015 |

OTHER PUBLICATIONS

Singh, Kundan et al., "Private Overlay of Enterprise Social Data and Interactions in the Public Web Context," presented at the 9th IEEE International Conference on Collaborative Computing: Networking, Applications and Worksharing (Collaboratecom), Oct. 20-23, 2013, Austin, Texas, IEEE, 10 pages.

Berners-Lee, Tim, "Socially Aware Cloud Storage," Notes on web design, Aug. 17, 2009, http://www.w3.org/DesignIssues/CloudStorage.html, 9 pages.

Chandra, Ramesh et al., "Separating Web Applications from User Data Storage with BStore," presented at the USENIX Conference

(56) References Cited

OTHER PUBLICATIONS on Web Application Development, Jun. 2010, Boston, Massachusettes, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vahdat/webfs/webfs.html, 12 pages.
Non-Final Office Action for U.S. Appl. No. 14/037,440, mailed Sep. 12, 2014, 15 pages.
Johnston, Alan et al., "Taking on WebRTC in an Enterprise," IEEE Communications Magazine, Apr. 2013, pp. 48-54, vol. 51, Issue 4.
Search Report for British patent application GB1317121.0 mailed Mar. 14, 2014, 3 pages.
Search Report for British patent application GB1317122.8 mailed Mar. 11, 2014, 3 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Notice of Allowance for U.S. Appl. No. 13/931,968, mailed Mar. 23, 2015, 7 pages.
Final Office Action for U.S. Appl. No. 13/835,913, mailed Mar. 26, 2015, 17 pages.
Final Office Action for U.S. Appl. No. 14/037,440, mailed Feb. 11, 2015, 19 pages.
Non-Final Office Action for U.S. Appl. No. 14/068,839, mailed Feb. 20, 2015, 15 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 mailed Dec. 30, 2014, 4 pages.
Search Report for British patent application GB1411580.2 mailed Dec. 30, 2014, 4 pages.
Non-Final Office Action for U.S. Appl. No. 13/931,968, mailed Dec. 8, 2014, 6 pages.
Non-Final Office Action for U.S. Appl. No. 13/835,913, mailed Nov. 20, 2014, 15 pages.
Non-Final Office Action for U.S. Appl. No. 13/803,292, mailed Jan. 27, 2015, 13 pages.
Non-Final Office Action for U.S. Appl. No. 14/050,891, mailed Jan. 29, 2015, 9 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, mailed Apr. 24, 2015, 4 pages.
Advisory Action for U.S. Appl. No. 14/037,440, mailed May 20, 2015, 3 pages.
Search Report for British Patent Application GB1419338.7, mailed Apr. 27, 2015, 4 pages.
Search Report for British Patent Application GB1419334.6, mailed Apr. 28, 2015, 6 pages.
Notice of Allowance for U.S. Appl. No. 13/944,368, mailed Apr. 1, 2015, 8 pages.
Non-Final Office Action for U.S. Appl. No. 13/931,967, mailed May 5, 2015, 10 pages.
Non-Final Office Action for U.S. Appl. No. 13/931,970, mailed May 7, 2015, 9 pages.
Examination Report for British Patent Application GB1411584.4, mailed Aug. 21, 2015, 1 page.
Examination Report for British Patent Application GB1411580.2, mailed Aug. 21, 2015, 1 page.
Notification of Reasons for Refusal for Japanese Patent Application 2013-201221, mailed Aug. 25, 2015, 8 pages.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dispatched Jun. 11, 2015, 8 pages.
Extended European Search Report for European Patent Application 15161452.6, mailed Jun. 23, 2015, 5 pages.
Advisory Action for U.S. Appl. No. 13/835,913, mailed Jun. 10, 2015, 3 pages.
Final Office Action for U.S. Appl. No. 13/803,292, mailed Jun. 12, 2015, 17 pages.
Final Office Action and Examiner Initiated Interview Summary for U.S. Appl. No. 14/050,891, mailed Jun. 29, 2015, 11 pages.
Corrected Notice of Allowability for U.S. Appl. No. 13/944,368, mailed Jul. 23, 2015, 4 pages.
Non-Final Office Action for U.S. Appl. No. 14/141,798, mailed Jul. 17, 2015, 13 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Non-Final Office Action for U.S. Appl. No. 13/835,913, mailed Sep. 3, 2015, 19 pages.
Non-Final Office Action for U.S. Appl. No. 13/912,520, mailed Sep. 9, 2015, 21 pages.
Non-Final Office Action for U.S. Appl. No. 13/863,662, mailed Sep. 25, 2015, 23 pages.

(56) References Cited

OTHER PUBLICATIONS

Advisory Action for U.S. Appl. No. 13/803,292, mailed Aug. 21, 2015, 3 pages.
Non-Final Office Action for U.S. Appl. No. 13/803,292, mailed Oct. 9, 2015, 13 pages.
Advisory Action and Examiner-Initiated Interview Summary for U.S. Appl. No. 14/050,891, mailed Sep. 29, 2015, 4 pages.
Final Office Action for U.S. Appl. No. 14/068,839, mailed Sep. 9, 2015, 17 pages.
Final Office Action for U.S. Appl. No. 13/931,967, mailed Aug. 20, 2015, 12 pages.
Final Office Action for U.S. Appl. No. 13/931,970, mailed Aug. 27, 2015, 10 pages.
Author Unknown, "WebRTC," WebRTC.org, Date Accessed: Jan. 26, 2016, 4 pages, http://webrtc.org/.
Notice of Allowance for U.S. Appl. No. 13/863,662, mailed Feb. 1, 2016, 17 pages.
Advisory Action and Examiner-Initiated Interview Summary for U.S. Appl. No. 14/068,839, mailed Feb. 12, 2016, 4 pages.
Final Office Action for U.S. Appl. No. 14/141,798, mailed Dec. 24, 2015, 10 pages.
Non-Final Office Action for U.S. Appl. No. 14/174,371, mailed Feb. 18, 2016, 18 pages.
Non-Final Office Action for U.S. Appl. No. 13/931,970, mailed Feb. 23, 2016, 11 pages.
Non-Final Office Action for U.S. Appl. No. 13/955,711, mailed Nov. 9, 2015, 10 pages.
Notice of Allowance for U.S. Appl. No. 14/050,891, mailed Nov. 10, 2015, 10 pages.
Non-Final Office Action for U.S. Appl. No. 14/037,440, mailed Oct. 22, 2015, 15 pages.
Advisory Action for U.S. Appl. No. 13/931,967, mailed Nov. 3, 2015, 3 pages.
Advisory Action for U.S. Appl. No. 13/931,970, mailed Nov. 5, 2015, 3 pages.
Non-Final Office Action for U.S. Appl. No. 14/068,943, mailed Dec. 2, 2015, 16 pages.
Non-Final Office Action for U.S. Appl. No. 14/255,429, mailed Nov. 9, 2015, 26 pages.
Search Report for British Patent Application No. GB1423089.0, mailed Jul. 6, 2015, 4 pages.

\* cited by examiner

ACQUIRING AND CORRELATING WEB REAL-TIME COMMUNICATIONS (WEBRTC) INTERACTIVE FLOW CHARACTERISTICS, AND RELATED METHODS, SYSTEMS, AND COMPUTER-READABLE MEDIA

BACKGROUND

Field of the Disclosure

The technology of the disclosure relates generally to Web Real-Time Communications (WebRTC) interactive sessions.

Technical Background

Web Real-Time Communications (WebRTC) is an ongoing effort to develop industry standards for integrating real-time communications functionality into web clients, such as web browsers, to enable direct interaction with other web clients. This real-time communications functionality is accessible by web developers via standard markup tags, such as those provided by version 5 of the Hypertext Markup Language (HTML5), and client-side scripting Application Programming Interfaces (APIs) such as JavaScript APIs. More information regarding WebRTC may be found in "WebRTC: APIs and RTCWEB Protocols of the HTML5 Real-Time Web," by Alan B. Johnston and Daniel C. Burnett, $2^{nd}$ Edition (2013 Digital Codex LLC), which is incorporated in its entirety herein by reference.

WebRTC provides built-in capabilities for establishing real-time video, audio, and/or data streams in both point-to-point interactive sessions and multi-party interactive sessions. The WebRTC standards are currently under joint development by the World Wide Web Consortium (W3C) and the Internet Engineering Task Force (IETF). Information on the current state of WebRTC standards can be found at, e.g., http://www.w3c.org and http://www/ietf.org.

To establish a WebRTC interactive flow (e.g., a real-time video, audio, and/or data exchange), two WebRTC clients may retrieve WebRTC-enabled web applications, such as HTML5/JavaScript web applications, from a web application server. Through the web applications, the two WebRTC clients then engage in dialogue for initiating a peer connection over which the WebRTC interactive flow will pass. The peer connection initiation dialogue includes any data transmitted between the two WebRTC clients and/or the web application server facilitating the establishment of the WebRTC interactive flow. As non-limiting examples, the peer connection initiation dialogue may include WebRTC session description objects, HTTP header data, certificates, cryptographic keys, and/or network routing data. The peer connection initiation dialogue may include a media negotiation to communicate and reach an agreement on parameters that define characteristics of the interactive session.

In some embodiments, the media negotiation may be implemented via a WebRTC offer/answer exchange. A WebRTC offer/answer exchange typically occurs via a secure network connection such as a Hyper Text Transfer Protocol Secure (HTTPS) connection or a Secure WebSockets connection. In a WebRTC offer/answer exchange, a first WebRTC client on a sender computing device sends an "offer" to a second WebRTC client on a recipient computing device. The offer includes a WebRTC session description object that specifies media types and capabilities that the first WebRTC client supports and prefers for use in the WebRTC interactive flow. The second WebRTC client then responds with a WebRTC session description object "answer" that indicates which of the offered media types and capabilities are supported and acceptable by the second WebRTC client for the WebRTC interactive flow. It is to be understood that the peer connection initiation dialogue may employ mechanisms other than a WebRTC offer/answer exchange to establish a WebRTC interactive flow between WebRTC endpoints.

Once the peer connection initiation dialogue is complete, the WebRTC clients may then establish a direct peer connection with one another, and may begin an exchange of media or data packets transporting real-time communications. The peer connection between the WebRTC clients typically employs the Secure Real-time Transport Protocol (SRTP) to transport real-time media flows, and may utilize various other protocols for real-time data interchange.

Some environments may require that records of all communication interactions, including WebRTC interactive flows, be maintained for security, legal, usage bill back, and/or archival purposes. For instance, enterprise policies may dictate that records documenting all WebRTC interactive flows transmitted across an enterprise network are to be kept. However, because the peer connection initiation dialogue and the peer connection itself may take place over secure network connections or may be otherwise encrypted, data in the peer connection initiation dialogue and the WebRTC interactive flow that could offer insight into the WebRTC interactive flow may be opaque to the enterprise. Thus, the enterprise may lack the ability to generate records of a WebRTC interactive flow beyond the most elemental data regarding the network traffic constituting the WebRTC interactive flow. Moreover, the use of a central network element between endpoints to monitor the WebRTC interactive flow may not be practicable or desirable due to the topology of a typical WebRTC interactive flow. As non-limiting examples, the WebRTC interactive flow may pass directly from one endpoint to the other, thus bypassing the central network element.

SUMMARY OF THE DETAILED DESCRIPTION

Embodiments disclosed in the detailed description provide acquiring and correlating Web Real-Time Communications (WebRTC) interactive flow characteristics. Related methods, systems, and computer-readable media are also disclosed. In this regard, in one embodiment, a method for acquiring and correlating characteristics of WebRTC interactive flows is provided. The method comprises receiving, by an acquisition agent of a WebRTC client executing on a computing device, a peer connection initiation dialogue for establishing a WebRTC interactive flow. The method further comprises determining, by the acquisition agent, one or more characteristics of the WebRTC interactive flow based on the peer connection initiation dialogue. The method additionally comprises receiving, by a correlation agent, the one or more characteristics of the WebRTC interactive flow from the acquisition agent. The method also comprises storing, by the correlation agent, the one or more characteristics of the WebRTC interactive flow. The method further comprises correlating, by the correlation agent, one or more stored characteristics. The method additionally comprises generating, by the correlation agent, one or more interaction records based on the correlating.

In another embodiment, a system for acquiring and correlating characteristics of WebRTC interactive flows is provided. The system comprises at least one communications interface, and a first computing device associated with the at least one communications interface and comprising an acquisition agent. The acquisition agent is configured to receive a peer connection initiation dialogue for establishing a WebRTC interactive flow. The acquisition agent is further configured to determine one or more characteristics of the WebRTC interactive flow based on the peer connection initiation dialogue. The system further comprises a second computing device associated with the at least one communications interface and comprising a correlation agent. The correlation agent is configured to receive the one or more characteristics of the WebRTC interactive flow from the acquisition agent. The correlation agent is further configured to store the one or more characteristics of the WebRTC interactive flow. The correlation agent is additionally configured to correlate one or more stored characteristics. The correlation agent is also configured to generate one or more interaction records based on the correlating.

In another embodiment, a non-transitory computer-readable medium is provided. The non-transitory computer-readable medium has stored thereon computer-executable instructions to cause a processor to implement a method comprising receiving, by an acquisition agent of a WebRTC client, a peer connection initiation dialogue for establishing a WebRTC interactive flow. The method implemented by the computer-executable instructions further comprises determining, by the acquisition agent, one or more characteristics of the WebRTC interactive flow based on the peer connection initiation dialogue. The method implemented by the computer-executable instructions additionally comprises receiving, by a correlation agent, the one or more characteristics of the WebRTC interactive flow from the acquisition agent. The method implemented by the computer-executable instructions also comprises storing, by the correlation agent, the one or more characteristics of the WebRTC interactive flow. The method implemented by the computer-executable instructions further comprises correlating, by the correlation agent, one or more stored characteristics. The method implemented by the computer-executable instructions additionally comprises generating, by the correlation agent, one or more interaction records based on the correlating.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
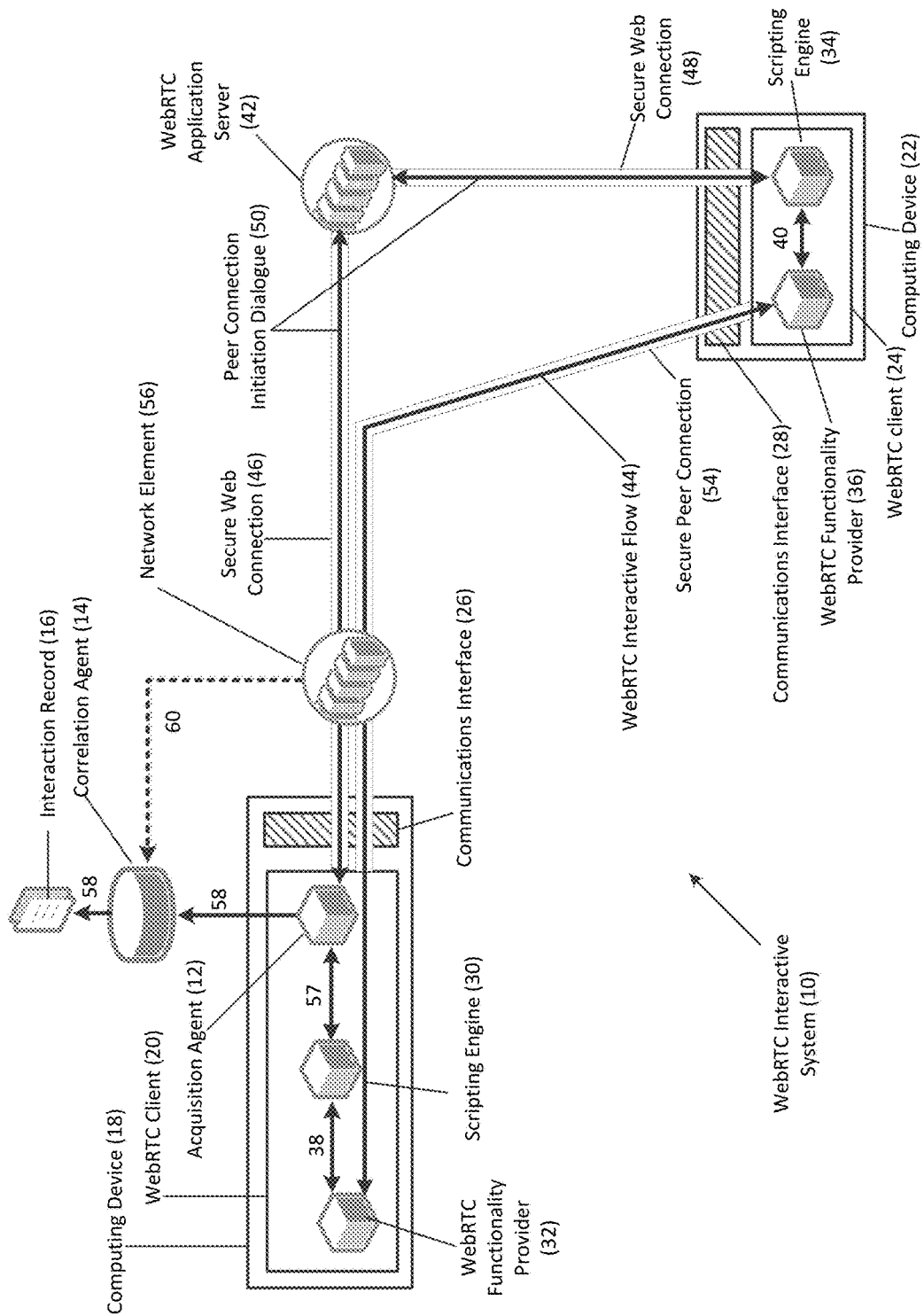
FIG. 1 is a conceptual diagram showing an exemplary "triangle" topology of a Web Real-Time Communications (WebRTC) interactive flow including a WebRTC client comprising an acquisition agent communicatively coupled to a correlation agent.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide acquiring and correlating Web Real-Time Communications (WebRTC) interactive flow characteristics. Related methods, systems, and computer-readable media are also disclosed. In this regard, in one embodiment, a method for acquiring and correlating characteristics of WebRTC interactive flows is provided. The method comprises receiving, by an acquisition agent of a WebRTC client executing on a computing device, a peer connection initiation dialogue for establishing a WebRTC interactive flow. The method further comprises determining, by the acquisition agent, one or more characteristics of the WebRTC interactive flow based on the peer connection initiation dialogue. The method additionally comprises receiving, by a correlation agent, the one or more characteristics of the WebRTC interactive flow from the acquisition agent. The method also comprises storing, by the correlation agent, the one or more characteristics of the WebRTC interactive flow. The method further comprises correlating, by the correlation agent, one or more stored characteristics. The method additionally comprises generating, by the correlation agent, one or more interaction records based on the correlating.

In this regard, FIG. 1 shows an exemplary WebRTC interactive system 10 for acquisition and correlation of WebRTC interactive flow characteristics as disclosed herein. In particular, the exemplary WebRTC interactive system 10 includes an acquisition agent 12 that provides a point for determining characteristics of a WebRTC interactive flow, which otherwise may be inaccessible to network elements. Additionally, the exemplary WebRTC interactive system 10 includes a correlation agent 14 that is communicatively coupled to the acquisition agent 12, and that correlates stored WebRTC interactive flow characteristics to generate an interaction record 16. As used herein, a "WebRTC interactive session" refers generally to operations for establishing a peer connection and commencing a WebRTC interactive flow between two or more endpoints. A "WebRTC interactive flow," as disclosed herein, refers to an interactive media flow and/or an interactive data flow that passes between or among two or more endpoints according to WebRTC standards and protocols. As non-limiting examples, an interactive media flow constituting a WebRTC interactive flow may comprise a real-time audio stream and/or a real-time video stream, or other real-time media or data streams. Data and/or media comprising a WebRTC interactive flow may be collectively referred to herein as "content."

Before discussing details of the acquisition agent 12 and the correlation agent 14, the establishment of a WebRTC interactive flow in the WebRTC interactive system 10 of FIG. 1 is first described. In FIG. 1, a first computing device 18 executes a first WebRTC client 20, and a second computing device 22 executes a second WebRTC client 24. It is to be understood that the computing devices 18 and 22 may both be located within a same public or private network, or may be located within separate, communicatively coupled public or private networks. Some embodiments of the WebRTC interactive system 10 of FIG. 1 may provide that each of the computing devices 18 and 22 may be any computing device having network communications capabilities, such as a smartphone, a tablet computer, a dedicated web appliance, a media server, a desktop or server computer, or a purpose-built communications device, as non-limiting examples. The computing devices 18 and 22 include communications interfaces 26 and 28 respectively, for connecting the computing devices 18 and 22 to one or more public and/or private networks. In some embodiments, the elements of the computing devices 18 and 22 may be distributed across more than one computing device 18 and 22.

The WebRTC clients 20 and 24, in this example, may each be a web browser application, a dedicated communications application, or an interface-less application such as a daemon or service application, as non-limiting examples. The WebRTC client 20 comprises a scripting engine 30 and a WebRTC functionality provider 32. Similarly, the WebRTC client 24 comprises a scripting engine 34 and a WebRTC functionality provider 36. The scripting engines 30 and 34 enable client-side applications written in a scripting language, such as JavaScript, to be executed within the WebRTC clients 20 and 24, respectively. The scripting engines 30 and 34 also provide application programming interfaces (APIs) to facilitate communications with other functionality providers within the WebRTC clients 20 and/or 24, the computing devices 18 and/or 22, and/or with other web clients, user devices, or web servers. The WebRTC functionality provider 32 of the WebRTC client 20 and the WebRTC functionality provider 36 of the WebRTC client 24 implement the protocols, codecs, and APIs necessary to enable real-time interactive flows via WebRTC. The scripting engine 30 and the WebRTC functionality provider 32 are communicatively coupled via a set of defined APIs, as indicated by bidirectional arrow 38. Likewise, the scripting engine 34 and the WebRTC functionality provider 36 are communicatively coupled as shown by bidirectional arrow 40.

A WebRTC application server 42 is provided for serving a WebRTC-enabled web application (not shown) to requesting WebRTC clients 20, 24. In some embodiments, the WebRTC application server 42 may be a single server, while in some applications the WebRTC application server 42 may comprise multiple servers that are communicatively coupled to each other. It is to be understood that the WebRTC application server 42 may reside within the same public or private network as the computing devices 18 and/or 22, or may be located within a separate, communicatively coupled public or private network.

FIG. 1 further illustrates the characteristic WebRTC "triangle" topology that results from establishing a WebRTC interactive flow 44 between the WebRTC client 20 and the WebRTC client 24. To establish the WebRTC interactive flow 44, the WebRTC client 20 and the WebRTC client 24 both download a same WebRTC web application (not shown) from the WebRTC application server 42. In some embodiments, the WebRTC web application comprises an HTML5/JavaScript web application that provides a rich user interface using HTML5, and uses JavaScript to handle user input and to communicate with the WebRTC application server 42.

The WebRTC client 20 and the WebRTC client 24 then establish secure web connections 46 and 48, respectively, with the WebRTC application server 42, and engage in a peer connection initiation dialogue 50. The peer connection initiation dialogue 50 may include any data transmitted between or among the WebRTC client 20, the WebRTC client 24, and/or the WebRTC application server 42 to establish a peer connection for the WebRTC interactive flow 44. The peer connection initiation dialogue 50 may include WebRTC session description objects, HTTP header data, certificates, cryptographic keys, and/or network routing data, as non-limiting examples. In some embodiments, the peer connection initiation dialogue 50 may comprise a WebRTC offer/answer exchange. Data exchanged during the peer connection initiation dialogue 50 may be used to determine the media types and capabilities for the desired WebRTC interactive flow 44. Once the peer connection initiation dialogue 50 is complete, the WebRTC interactive flow 44 may be established via a secure peer connection 54 between the WebRTC client 20 and the WebRTC client 24. Accordingly, in FIG. 1 the vertices of the WebRTC "triangle" are the WebRTC application server 42, the WebRTC client 20, and the WebRTC client 24. The edges of the "triangle" are represented by the secure web connections 46 and 48 and the secure peer connection 54.

It is to be understood that some embodiments may utilize topographies other than the WebRTC "triangle" topography illustrated in FIG. 1. For example, some embodiments may employ a "trapezoid" topography in which two web servers communicate directly with each other via protocols such as Session Initiation Protocol (SIP) or Jingle, as non-limiting examples. It is to be further understood that, instead of the WebRTC client 24, the computing device 22 may comprise a SIP client device, a Jingle client device, or a Public Switched Telephone Network (PSTN) gateway device that is communicatively coupled to a telephone.

In some embodiments, the secure web connection 46 and/or the secure peer connection 54 may pass through a network element 56. The network element 56 may be a computing device having network communications capabilities and providing media transport and/or media processing functionality. As a non-limiting example, the network element 56 may be a Traversal Using Relays around NAT (TURN) server.

In the example of FIG. 1, the peer connection initiation dialogue 50 takes place over the secure web connection 46, while the resulting WebRTC interactive flow 44 passes via the secure peer connection 54. As a result, it may be impracticable or impossible for an entity over whose network the WebRTC interactive flow 44 takes place to generate a record of the WebRTC interactive flow 44 for security, legal, usage bill back, and/or archival purposes. For example, if the WebRTC client 20 is part of an enterprise network, elements of the enterprise network responsible for enforcing enterprise policies may be unable to determine an identity of the participants, websites, or servers involved in the WebRTC interactive flow 44.

In this regard, the acquisition agent 12 and the correlation agent 14 of FIG. 1 are provided. The acquisition agent 12 is communicatively coupled to the scripting engine 30 of the WebRTC client 20, as indicated by bidirectional arrow 57. In some embodiments, the acquisition agent 12 may be implemented as an extension or plug-in for the WebRTC client 20, may be integrated into the WebRTC functionality provider 32 and/or the scripting engine 30, and/or may be part of the WebRTC application (not shown) downloaded from the WebRTC application server 42. The acquisition agent 12 is configured to access the content of the peer connection initiation dialogue 50 after it is received within the WebRTC client 20. The acquisition agent 12 may also access data provided by packets transporting the peer connection initiation dialogue 50, such as a source Internet Protocol (IP) address, a destination IP address, a source port number, a destination port number, and/or a network protocol in use, as non-limiting examples. Accordingly, during establishment of a WebRTC interactive flow 44, the acquisition agent 12 of FIG. 1 receives the peer connection initiation dialogue 50 transported over the secure web connection 46. The acquisition agent 12 may determine characteristics of the WebRTC interactive flow 44 based on the peer connection initiation dialogue 50. In the case of unsecured network traffic, the acquisition agent 12 may similarly analyze the peer connection initiation dialogue 50 for the purpose of determining characteristics of the WebRTC interactive flow 44. As non-limiting examples, the acquisition agent 12 may determine WebRTC interactive flow 44 characteristics including but not limited to the following: a user identity, a website identity, a transport identity, a server identity, a transport address, an Internet Protocol (IP) address, an indication of a change to a media flow, an indication of a termination of a media flow, and/or a timestamp.

The acquisition agent 12 transmits the determined characteristics of the WebRTC interactive flow 44 (represented by arrow 58) to the correlation agent 14. In some embodiments, the acquisition agent 12 is communicatively coupled to the correlation agent 14 via a Hyper Text Transfer Protocol (HTTP), Hyper Text Transfer Protocol Secure (HTTPS), or a WebSockets connection, as non-limiting examples. Some embodiments may provide that the acquisition agent 12 may transmit the WebRTC interactive flow characteristics over a secure WebRTC data flow (not shown) established between the acquisition agent 12 and the correlation agent 14. The correlation agent 14 may be located on the computing device 18, on a different computing device within the same public or private network as the computing device 18, or on a computing device in a separate, communicatively coupled public or private network.

Upon receiving the WebRTC interactive flow characteristics, the correlation agent 14 stores the WebRTC interactive flow characteristics for concurrent or later use in generating the interaction record 16. The correlation agent 14 may employ any appropriate database or data repository known to one of skill in the art to store the WebRTC interactive flow characteristics. The correlation agent 14 may then correlate one or more stored characteristics (not shown) related to the WebRTC interactive flow 44 and/or one or more concurrent or previous WebRTC interactive flows (not shown). In some embodiments, the one or more stored characteristics may be characteristics of the WebRTC interactive flow 44 gathered from multiple sources, while some embodiments may provide that the one or more stored characteristics is related to other concurrent or previous WebRTC interactive flows. In this manner, the correlation agent 14 may gain insight into aspects of the WebRTC interactive flow 44 that otherwise may be difficult to ascertain, such as an identity of one or more participants in the WebRTC interactive flow 44, endpoint capabilities, or information regarding websites and servers involved in the WebRTC interactive flow 44, as non-limiting examples. The correlation agent 14 generates the interaction record 16 based on the results of the correlating. In some embodiments, the interaction record 16 may comprise a call description record, a call detail record, or a transaction record, as non-limiting examples.

Some embodiments may provide that the correlation agent 14 also receives media characteristics (indicated by dashed arrow 60) from one or more network elements 56 providing media transport and/or media processing functionality. In some embodiments, the media characteristics may include media transport characteristics such as data regarding changes to the WebRTC interactive flow 44, routing of the WebRTC interactive flow 44, or termination of the WebRTC interactive flow 44. According to some embodiments disclosed herein, the media characteristics may include media processing characteristics such as data related to encoding and/or transcoding the WebRTC interactive flow 44. The media characteristics may be stored by the correlation agent 14, and correlated with stored WebRTC interactive flow characteristics and/or stored media characteristics to generate the interaction record 16.

Figure 2:
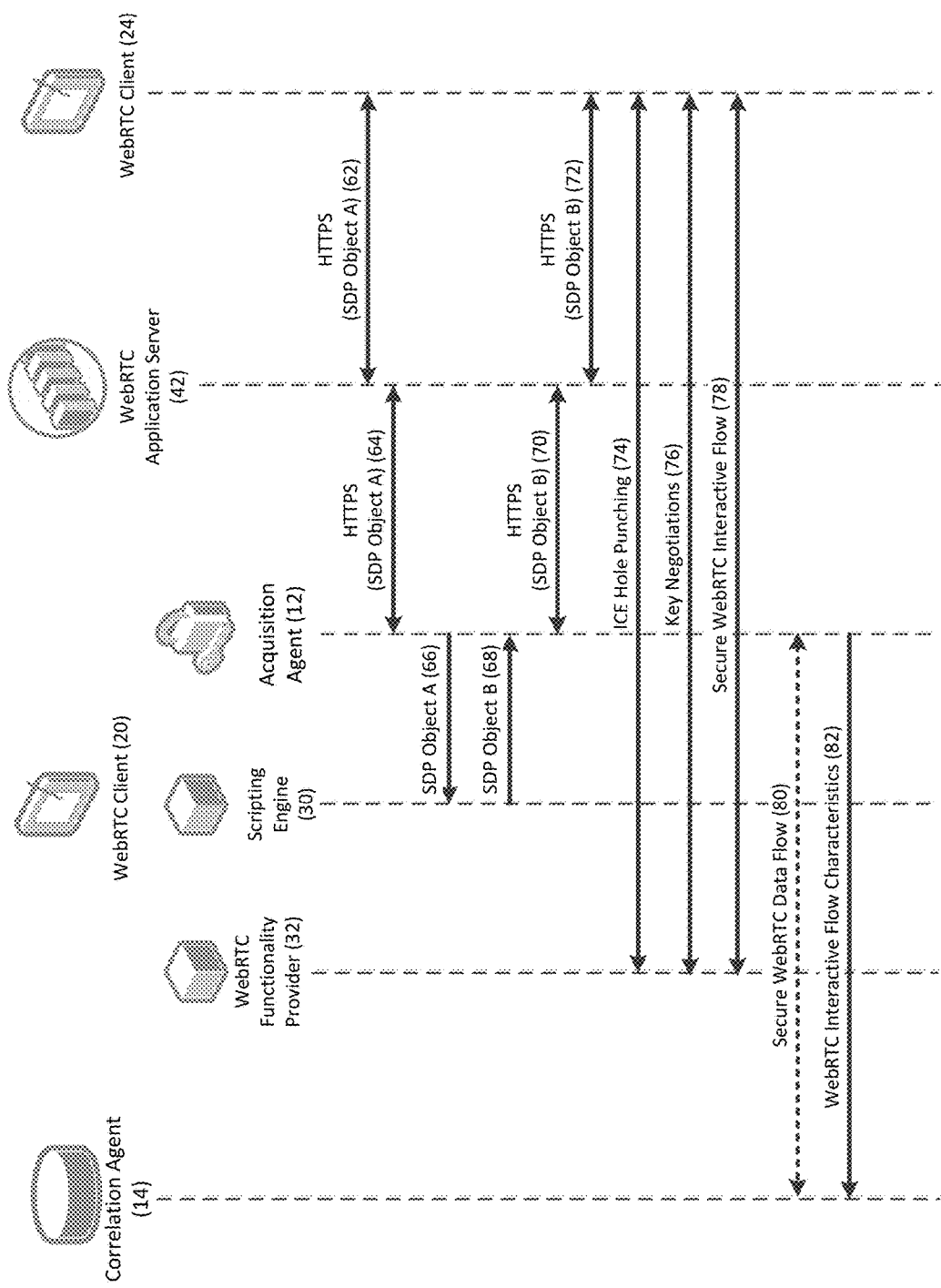
FIG. 2 is a diagram illustrating exemplary communications flows within an exemplary system including an acquisition agent and a correlation agent.

To illustrate exemplary communications flows during the acquiring and correlating of WebRTC interactive flow characteristics by the acquisition agent 12 and the correlation agent 14 of FIG. 1, FIG. 2 is provided. In FIG. 2, the correlation agent 14, the WebRTC client 20, the WebRTC application server 42, and the WebRTC client 24 of FIG. 1 are each represented by vertical dotted lines. The WebRTC functionality provider 32, the scripting engine 30, and the acquisition agent 12 of the WebRTC client 20 are shown as separate elements to better illustrate communications flows therebetween. It is to be understood that the WebRTC client 24 may comprise a scripting engine 34 and a WebRTC functionality provider 36, which for the sake of clarity are omitted from this example. It is to be further understood that the WebRTC clients 20 and 24 have each downloaded a WebRTC-enabled web application, such as an HTML5/JavaScript WebRTC application, from the WebRTC application server 42.

As seen in FIG. 2, the establishment of a WebRTC interactive flow begins with a WebRTC offer/answer exchange that corresponds to the peer connection initiation dialogue 50 of FIG. 1. Accordingly, the WebRTC client 24 sends a session description object to the WebRTC application server 42 in an encrypted format (in this example, via an HTTPS connection). The WebRTC session description object is a Session Description Protocol (SDP) object referred to as SDP Object A and is indicated by arrow 62. SDP Object A represents the "offer" in the WebRTC offer/answer exchange. SDP Object A specifies the media types and capabilities that the WebRTC client 24 supports and prefers for use in the WebRTC interactive flow. The WebRTC application server 42 forwards the SDP Object A by a secure web connection to the acquisition agent 12 of the WebRTC client 20, as indicated by arrow 64.

As noted above, the acquisition agent 12 may access the contents of the SDP Object A of the peer connection initiation dialogue 50, and may also access other data exchanged during the peer connection initiation dialogue 50, such as HTTP header data, certificates, cryptographic keys, and/or network routing data provided by packets transporting the peer connection initiation dialogue 50. In this manner, the acquisition agent 12 may determine characteristics of a WebRTC interactive flow to be established. In some embodiments, WebRTC interactive flow characteristics may include a user identity, a website identity, a transport identity, a server identity, a transport address, an Internet Protocol (IP) address, an indication of a change to a media flow, an indication of a termination of a media flow, and/or a timestamp of the WebRTC interactive flow, as non-limiting examples.

The acquisition agent 12 next passes the SDP Object A to the scripting engine 30 for conventional processing, as indicated by arrow 66. After the scripting engine 30 receives the SDP Object A from the acquisition agent 12, the scripting engine 30 in response sends a WebRTC session description object, referred to as SDP Object B, to the acquisition agent 12 (indicated by arrow 68). The SDP Object B in this example represents the "answer" in the WebRTC offer/answer exchange. In some embodiments, the acquisition agent 12 may examine the SDP Object B to further determine characteristics of the WebRTC interactive flow to be established. The SDP Object B is then sent to the WebRTC application server 42 via a secure network connection, as indicated by arrow 70. The WebRTC application server 42, in turn, forwards the SDP Object B to the WebRTC client 24, as shown by arrow 72.

With continuing reference to FIG. 2, the WebRTC clients 20 and 24 (in particular, the WebRTC functionality provider 32) then begin "hole punching" to determine the best way to establish direct communications between the WebRTC clients 20 and 24. The hole punching process is indicated by bidirectional arrow 74 in FIG. 2. Hole punching is a technique, often using protocols such as Interactive Connectivity Establishment (ICE), in which two web clients establish a connection with an unrestricted third-party server (not shown) that uncovers external and internal address information for use in direct communications. If the hole punching is successful, the WebRTC client 24 and the WebRTC functionality provider 32 of the WebRTC client 20 begin key negotiations to establish a secure peer connection (indicated by bidirectional arrow 76). Upon establishing a secure peer connection, the WebRTC client 24 and the WebRTC functionality provider 32 of the WebRTC client 20 begin exchanging a secure WebRTC interactive flow, as shown by bidirectional arrow 78.

The acquisition agent 12 of the WebRTC client 20 communicates the determined characteristics of the WebRTC interactive flow to the correlation agent 14 for storing. In some embodiments, the WebRTC interactive flow characteristics may be communicated via a secure HTTP/HTTPS connection or WebSockets connection, while some embodiments may provide that the characteristics are communicated via a WebRTC data flow established between the acquisition agent 12 and the correlation agent 14. In the latter scenario, the acquisition agent 12 and the correlation agent 14 first establish a secure WebRTC data flow, as indicated by bidirectional arrow 80. The correlation agent 14 then receives and stores the characteristics of the WebRTC interactive flow from the acquisition agent 12, as shown by arrow 82.

Figure 3:
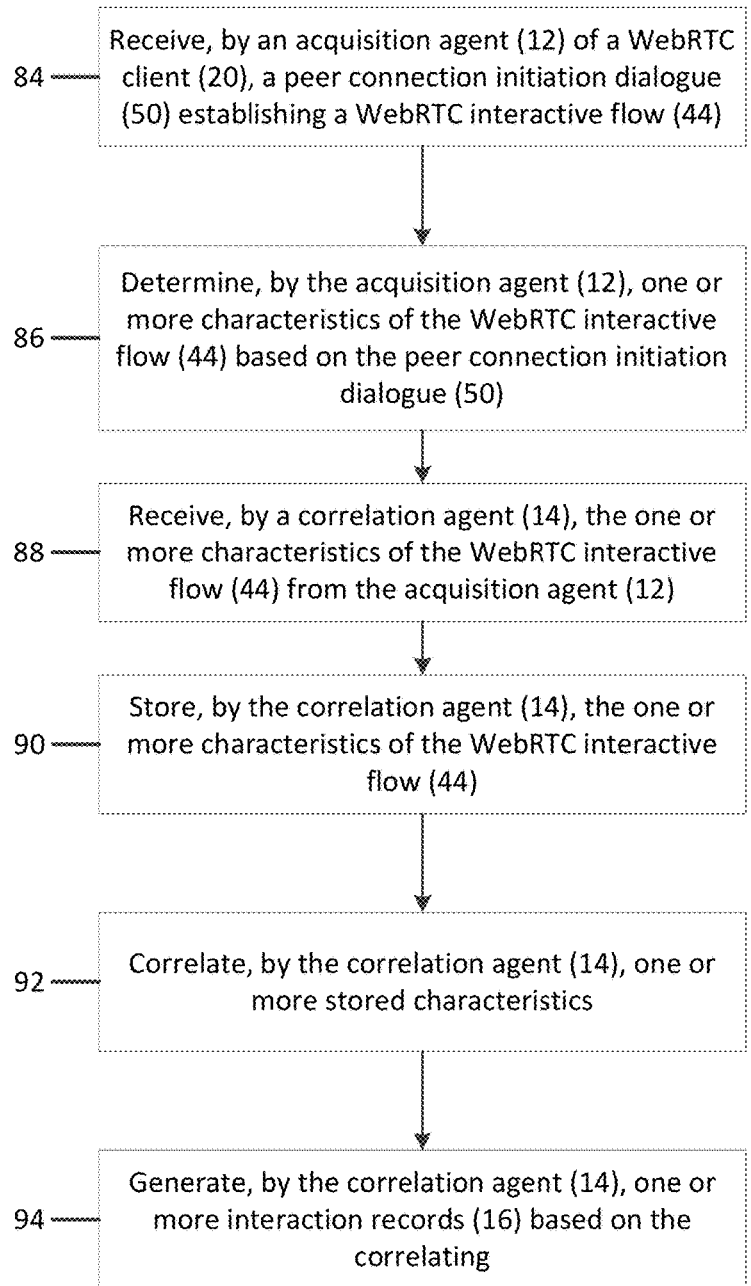
FIG. 3 is a flowchart illustrating exemplary operations for acquiring and correlating WebRTC interactive flow characteristics.

To generally describe exemplary operations for acquiring and correlating WebRTC interactive flow characteristics, FIG. 3 is provided. For the sake of clarity, FIG. 3 refers to elements of the exemplary WebRTC interactive system 10 of FIG. 1. FIG. 3 is a flowchart illustrating exemplary operations for the acquisition agent 12 and the correlation agent 14 of FIG. 1. In this example of FIG. 3, operations begin with the acquisition agent 12 of the WebRTC client 20 receiving a peer connection initiation dialogue 50 for establishing a WebRTC interactive flow 44 (block 84). The acquisition agent 12 next determines one or more characteristics of the WebRTC interactive flow 44 based on the peer connection initiation dialogue 50 (block 86). In some embodiments, the characteristics of the WebRTC interactive flow 44 may be determined based on a content of WebRTC session description objects (not shown) exchanged during the peer connection initiation dialogue 50, and/or on HTTP header data, certificates, cryptographic keys, and/or network routing data provided by packets transporting the peer connection initiation dialogue 50. As non-limiting examples, the characteristics of the WebRTC interactive flow 44 may include a user identity, a website identity, a transport identity, a server identity, a transport address, an Internet Protocol (IP) address, an indication of a change to a media flow, an indication of a termination of a media flow, and/or a timestamp of the WebRTC interactive flow 44.

The correlation agent 14 then receives the one or more characteristics of the WebRTC interactive flow 44 from the acquisition agent 12 (block 88). Some embodiments may provide that the WebRTC interactive flow characteristics may be communicated via a secure HTTP/HTTPS connection or WebSockets connection, or via a WebRTC data flow established between the acquisition agent 12 and the correlation agent 14. The correlation agent 14 next stores the one or more characteristics of the WebRTC interactive flow 44 (block 90). Storing the one or more characteristics of the WebRTC interactive flow 44 may comprise storing the characteristics in a database or other data repository accessible to the correlation agent 14.

The correlation agent 14 may then correlate one or more stored characteristics (not shown) related to the WebRTC interactive flow 44 and/or one or more concurrent or previous WebRTC interactive flows (not shown) (block 92). In some embodiments, the one or more stored characteristics may be characteristics of the WebRTC interactive flow 44 gathered from multiple sources, while some embodiments may provide that the one or more stored characteristics is related to other concurrent or previous WebRTC interactive flows. In this manner, the correlation agent 14 may gain insight into the participants or other aspects of the WebRTC interactive flow 44. Based on the correlating, the correlation agent 14 generates one or more interaction records 16 (block 94). The one or more interaction records 16 may include a call description record, a call detail record, or a transaction record, as non-limiting examples. In some embodiments, the stored WebRTC interactive flow characteristics may be subsequently deleted by the correlation agent 14 as necessary. As non-limiting examples, the stored WebRTC interactive flow characteristics may be expunged after a defined time interval has passed, or may be deleted upon a determination by the correlation agent 14 that the stored WebRTC interactive flow characteristics no longer provide useful insight.

Figure 4:
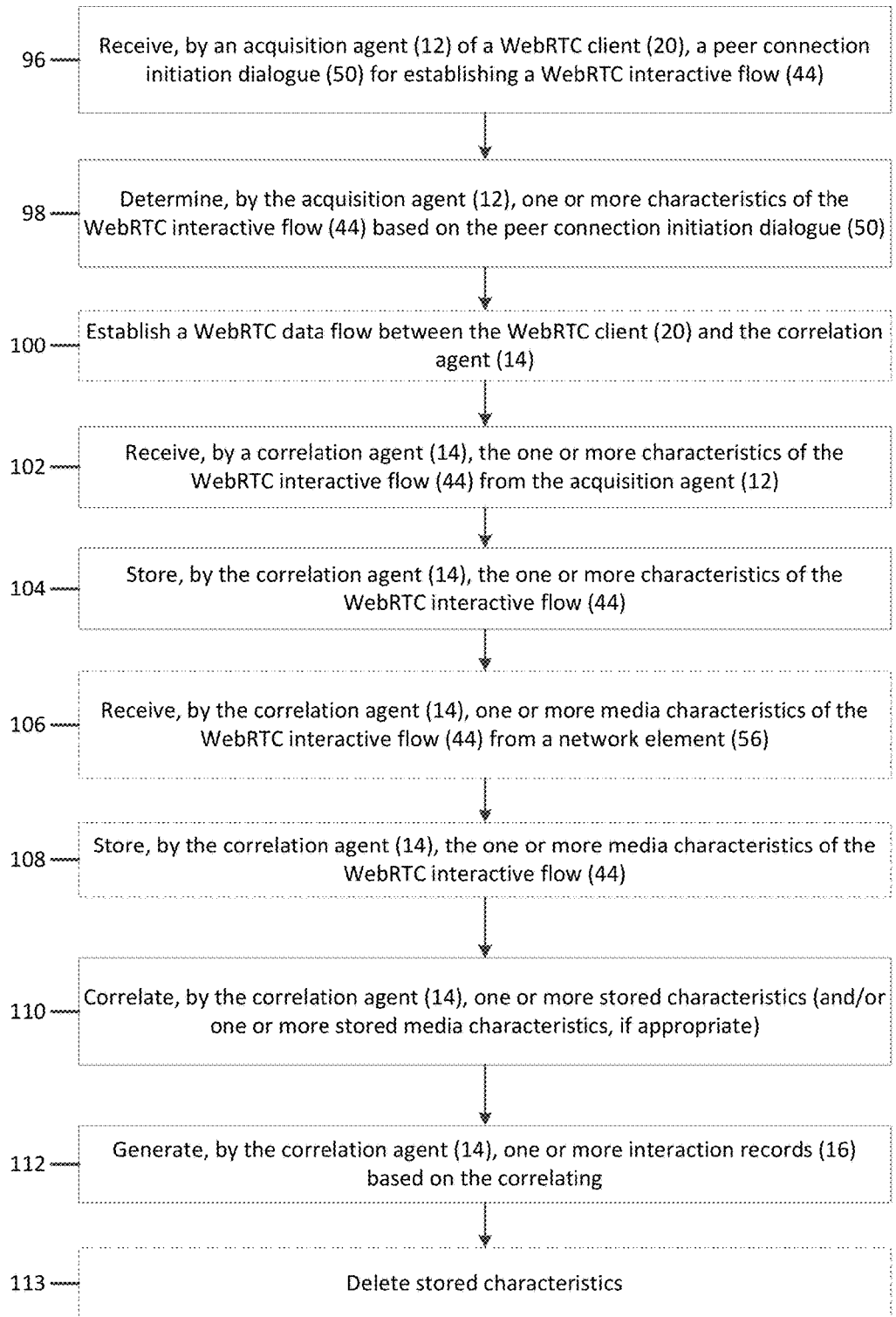
FIG. 4 is a flowchart illustrating more detailed exemplary operations for acquiring and correlating characteristics of WebRTC interactive flows.

FIG. 4 provides in more detail an exemplary generalized process for the acquisition agent 12 and the correlation agent 14 of FIG. 1 to provide acquisition and correlation of WebRTC interactive flow characteristics. For illustrative purposes, FIG. 4 refers to elements of the exemplary WebRTC interactive system 10 of FIG. 1. Operations begin with the acquisition agent 12 of the WebRTC client 20 receiving a peer connection initiation dialogue 50 for establishing a WebRTC interactive flow 44 (block 96). The acquisition agent 12 determines one or more characteristics of the WebRTC interactive flow 44 based on the peer connection initiation dialogue 50 (block 98). In some embodiments, the characteristics of the WebRTC interactive flow 44 may be determined based on a content of WebRTC session description objects (not shown) exchanged during the peer connection initiation dialogue 50, and/or on HTTP header data, certificates, cryptographic keys, and/or network routing data provided by packets transporting the peer connection initiation dialogue 50. The characteristics of the WebRTC interactive flow 44 determined by the acquisition agent 12 may include a user identity, a website identity, a transport identity, a server identity, a transport address, an Internet Protocol (IP) address, an indication of a change to a media flow, an indication of a termination of a media flow, and/or a timestamp of the WebRTC interactive flow 44, as non-limiting examples.

Some embodiments may provide that the acquisition agent 12 and the correlation agent 14 are configured to communicate via a secure HTTP/HTTPS connection or WebSockets connection, or via a WebRTC data flow established between the acquisition agent 12 and the correlation agent 14. In the latter scenario, the WebRTC client 20 may optionally establish a WebRTC data flow between the WebRTC client 20 and the correlation agent 14 (block 100).

The correlation agent 14 then receives the one or more characteristics of the WebRTC interactive flow 44 from the acquisition agent 12 (block 102). The correlation agent 14 stores the one or more characteristics of the WebRTC interactive flow 44 (block 104). According to some embodiments disclosed herein, storing the one or more characteristics of the WebRTC interactive flow 44 may comprise storing the characteristics in a database or other data repository accessible to the correlation agent 14.

The correlation agent 14 also may optionally receive one or more media characteristics of the WebRTC interactive flow 44 from a network element 56 (block 106). In some embodiments, the media characteristics may include media transport characteristics such as data regarding changes to the WebRTC interactive flow 44, routing of the WebRTC interactive flow 44, or termination of the WebRTC interactive flow 44. According to some embodiments disclosed herein, the media characteristics may include media processing characteristics such as data related to encoding and/or transcoding the WebRTC interactive flow 44. The correlation agent 14 may then store the one or more media characteristics of the WebRTC interactive flow 44 (block 108).

The correlation agent 14 may then correlate one or more stored characteristics (and/or one or more stored media characteristics, if appropriate) (block 110). By correlating the stored characteristics, the correlation agent 14 may generate insight into various facets of the WebRTC interactive flow 44 that may otherwise be difficult to determine. Such insight may include, as non-limiting examples, an identity of one or more participants, an insight into endpoint capabilities, or information regarding websites and servers involved in the WebRTC interactive flow 44. Based on the correlating, the correlation agent 14 may generate one or more interaction records 16 (block 112). In some embodiments, the one or more interaction records 16 may include a call description record, a call detail record, or a transaction record, as non-limiting examples. In some embodiments, the stored WebRTC interactive flow characteristics may be subsequently deleted by the correlation agent 14 as necessary (block 113). As non-limiting examples, the stored WebRTC interactive flow characteristics may be expunged after a defined time interval has passed, or may be deleted upon a determination by the correlation agent 14 that the stored WebRTC interactive flow characteristics no longer provide useful insight.

Figure 5:
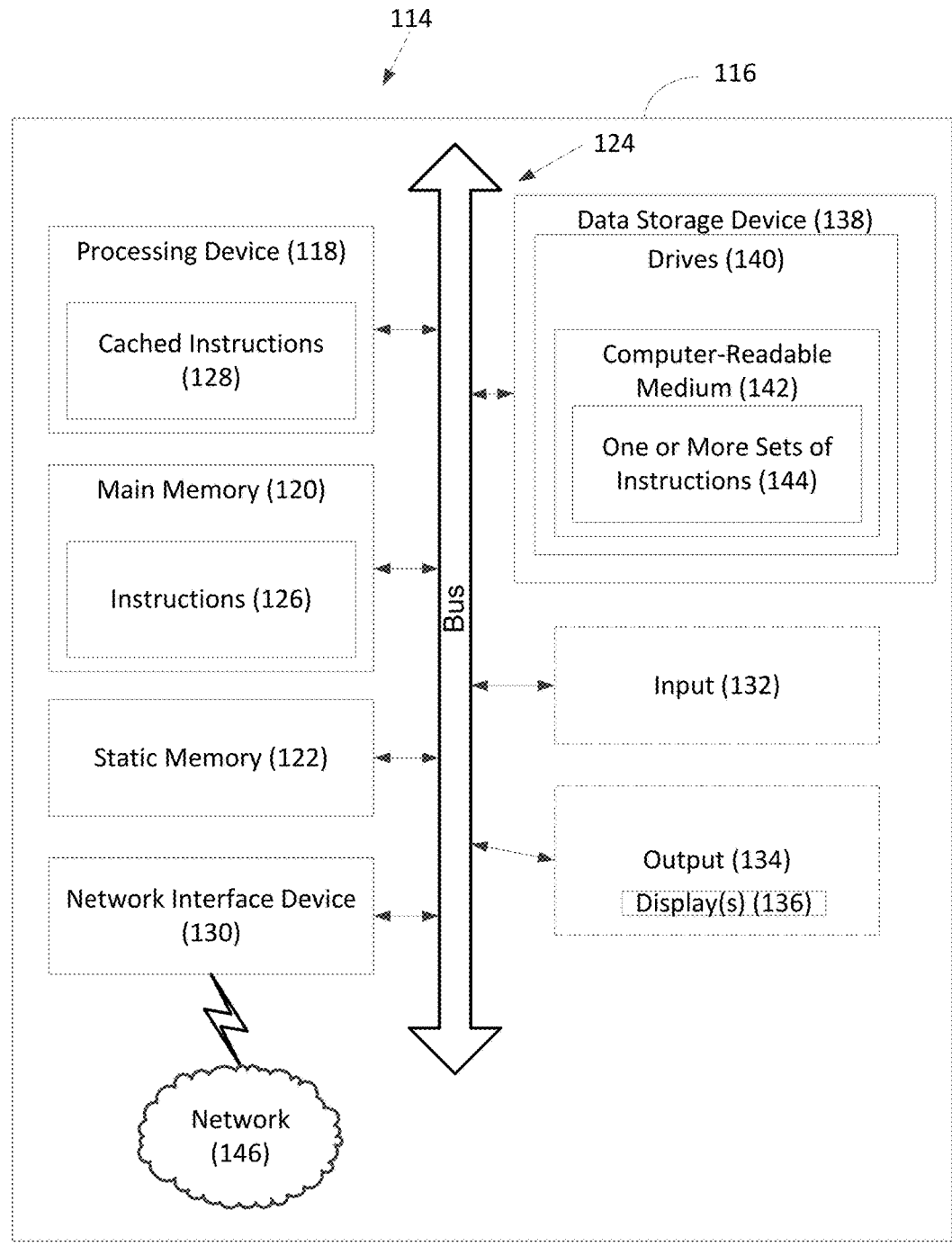
FIG. 5 is a block diagram of an exemplary processor-based system that may include the acquisition agent and the correlation agent of FIG. 1.

FIG. 5 provides a schematic diagram representation of a processing system 114 in the exemplary form of an exemplary computer system 116 adapted to execute instructions to perform the functions described herein. In some embodiments, the processing system 114 may execute instructions to perform the functions of the acquisition agent 12 and the correlation agent 14 of FIG. 1. In this regard, the processing system 114 may comprise the computer system 116, within which a set of instructions for causing the processing system 114 to perform any one or more of the methodologies discussed herein may be executed. The processing system 114 may be connected (as a non-limiting example, networked) to other machines in a local area network (LAN), an intranet, an extranet, or the Internet. The processing system 114 may operate in a client-server network environment, or as a peer machine in a peer-to-peer (or distributed) network environment. While only a single processing system 114 is illustrated, the terms "controller" and "server" shall also be taken to include any collection of machines that individually or jointly execute a set (or multiple sets) of instructions to perform any one or more of the methodologies discussed herein. The processing system 114 may be a server, a personal computer, a desktop computer, a laptop computer, a personal digital assistant (PDA), a computing pad, a mobile device, or any other device and may represent, as non-limiting examples, a server or a user's computer.

The exemplary computer system 116 includes a processing device or processor 118, a main memory 120 (as non-limiting examples, read-only memory (ROM), flash memory, dynamic random access memory (DRAM) such as synchronous DRAM (SDRAM), etc.), and a static memory 122 (as non-limiting examples, flash memory, static random access memory (SRAM), etc.), which may communicate with each other via a bus 124. Alternatively, the processing device 118 may be connected to the main memory 120 and/or the static memory 122 directly or via some other connectivity means.

The processing device 118 represents one or more processing devices such as a microprocessor, central processing unit (CPU), or the like. More particularly, the processing device 118 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 118 is configured to execute processing logic in instructions 126 and/or cached instructions 128 for performing the operations and steps discussed herein.

The computer system 116 may further include a communications interface in the form of a network interface device 130. It also may or may not include an input 132 to receive input and selections to be communicated to the computer system 116 when executing the instructions 126, 128. It also may or may not include an output 134, including but not limited to display(s) 136. The display(s) 136 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 116 may or may not include a data storage device 138 that includes using drive(s) 140 to store the functions described herein in a computer-readable medium 142, on which is stored one or more sets of instructions 144 (e.g., software) embodying any one or more of the methodologies or functions described herein. The functions can include the methods and/or other functions of the processing system 114, a participant user device, and/or a licensing server, as non-limiting examples. The one or more sets of instructions 144 may also reside, completely or at least partially, within the main memory 120 and/or within the processing device 118 during execution thereof by the computer system 116. The main memory 120 and the processing device 118 also constitute machine-accessible storage media. The instructions 126, 128, and/or 144 may further be transmitted or received over a network 146 via the network interface device 130. The network 146 may be an intra-network or an inter-network.

While the computer-readable medium 142 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 144. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, optical and magnetic media, and carrier wave signals.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for acquiring and correlating characteristics of Web Real-Time Communications (WebRTC) interactive flows, comprising:
   receiving, by an acquisition agent of a WebRTC client executing on a first computing device, a peer connection initiation dialogue for establishing a first communication session with a second computing device, the first communication session comprising a WebRTC interactive flow;
   determining, by the acquisition agent, one or more characteristics of the WebRTC interactive flow based on the peer connection initiation dialogue, wherein the one or more characteristics of the WebRTC interactive flow comprise a user identity, a website identity, a transport identity, a server identity, a transport address, an Internet Protocol (IP) address, an indication of a change to a media flow, an indication of a termination of a media flow, a timestamp, or combinations thereof;
   establishing, by the acquisition agent, a second communication session with a correlation agent executing on a third computing device, the second communication session being different from the first communication session, wherein the third computing device is different from the first computing device and the second computing device, wherein the correlation agent is separate from the acquisition agent, the WebRTC client, and the second computing device;
   transmitting, by the acquisition agent to the correlation agent over the second communication session, the one or more characteristics of the WebRTC interactive flow;
   storing, by the correlation agent, the one or more characteristics of the WebRTC interactive flow;
   correlating, by the correlation agent, the one or more characteristics of the WebRTC interactive flow; and
   generating, by the correlation agent, one or more interaction records based on the correlating.

2. The method of claim 1, further comprising:
   receiving, by the correlation agent, one or more media characteristics of the WebRTC interactive flow from a network element; and
   storing the one or more media characteristics;
   wherein the correlating comprises correlating the one or more media characteristics.

3. The method of claim 2, wherein the one or more media characteristics comprises one or more media transport characteristics or one or more media processing characteristics, or combinations thereof.

4. The method of claim 1, wherein:
   the second communication session comprises a WebRTC data flow; and
   transmitting the one or more characteristics of the WebRTC interactive flow comprises:
   establishing the WebRTC data flow between the acquisition agent and the correlation agent; and
   transmitting the one or more characteristics of the WebRTC interactive flow via the WebRTC data flow.

5. The method of claim 1, wherein the second communication session comprises communication via Hyper Text Transfer Protocol (HTTP), Hyper Text Transport Protocol Secure (HTTPS), WebSockets, or combinations thereof.

6. The method of claim 1, wherein the one or more interaction records comprises a call description record, a call detail record, or a transaction record.

7. A system for acquiring and correlating characteristics of Web Real-Time Communications (WebRTC) interactive flows, comprising:
   at least one communications interface;
   a first computing device associated with the at least one communications interface and
   comprising an acquisition agent, the acquisition agent configured to:
   receive a peer connection initiation dialogue for establishing a first communication session with a second computing device, the first communication session comprising a WebRTC interactive flow;
   determine one or more characteristics of the WebRTC interactive flow based on the peer connection initiation dialogue, wherein the one or more characteristics of the WebRTC interactive flow comprise a user identity, a website identity, a transport identity, a server identity, a transport address, an Internet Protocol (IP) address, an indication of a change to a media flow, an indication of a termination of a media flow, a timestamp, or combinations thereof;

establish a second communication session with a correlation agent of a third computing device, the second communication session being different from the first communication session, wherein the third computing device is different from the first computing device and the second computing device, wherein the correlation agent is separate from the acquisition agent, the WebRTC client, and the second computing device; and transmit to the correlation agent over the second communication session, the one or more characteristics of the WebRTC interactive flow; and the third computing device associated with the at least one communications interface and comprising the correlation agent, the correlation agent configured to:
   receive the one or more characteristics of the WebRTC interactive flow from the acquisition agent;
   store the one or more characteristics of the WebRTC interactive flow;
   correlate the one or more characteristics of the WebRTC interactive flow; and
   generate one or more interaction records based on the correlating.

8. The system of claim 7, wherein the correlation agent is further configured to:
   receive one or more media characteristics of the WebRTC interactive flow from a network element;
   store the one or more media characteristics; and
   correlate the one or more media characteristics.

9. The system of claim 7, wherein the second communication session comprises a WebRTC data flow between the acquisition agent and the correlation agent; and wherein the correlation agent is configured to receive the one or more characteristics of the WebRTC interactive flow via the WebRTC data flow.

10. The system of claim 7, wherein the second communication session comprises communication via Hyper Text Transfer Protocol (HTTP), Hyper Text Transport Protocol Secure (HTTPS), WebSockets, or combinations thereof.

11. The system of claim 7, wherein the correlation agent is further configured to generate the one or more interaction records comprising a call description record, a call detail record, or a transaction record.

12. A non-transitory computer-readable medium having stored thereon computer-executable instructions to cause a processor to implement a method, comprising:
   receiving, by an acquisition agent of a WebRTC client executing on a first computing device, a peer connection initiation dialogue for establishing a first communication session with a second computing device, the first communication session comprising a WebRTC interactive flow;
   determining, by the acquisition agent, one or more characteristics of the WebRTC interactive flow based on the peer connection initiation dialogue, wherein the one or more characteristics of the WebRTC interactive flow comprise a user identity, a website identity, a transport identity, a server identity, a transport address, an Internet Protocol (IP) address, an indication of a change to a media flow, an indication of a termination of a media flow, a timestamp, or combinations thereof;
   establishing, by the acquisition agent, a second communication session with a correlation agent executing on a third computing device, the second communication session being different from the first communication session, wherein the third computing device is different from the first computing device and the second computing device, wherein the correlation agent is separate from the acquisition agent, the WebRTC client, and the second computing device;
   transmitting, by the acquisition agent to the correlation agent over the second communication session, the one or more characteristics of the WebRTC interactive flow;
   storing, by the correlation agent, the one or more characteristics of the WebRTC interactive flow;
   correlating, by the correlation agent, the one or more characteristics of the WebRTC interactive flow; and
   generating, by the correlation agent, one or more interaction records based on the correlating.

13. The non-transitory computer-readable medium of claim 12 having stored thereon the computer-executable instructions to cause the processor to implement the method, further comprising:
   receiving, by the correlation agent, one or more media characteristics of the WebRTC interactive flow from a network element; and
   storing the one or more media characteristics of the WebRTC interactive flow;
   wherein the correlating comprises correlating the one or more media characteristics of the WebRTC interactive flow.

14. The non-transitory computer-readable medium of claim 13 having stored thereon the computer-executable instructions to cause the processor to implement the method, wherein the one or more media characteristics comprises one or more media transport characteristics, one or more media processing characteristics, or combinations thereof.

15. The non-transitory computer-readable medium of claim 12 having stored thereon the computer-executable instructions to cause the processor to implement the method, wherein:
   the second communication session comprises a WebRTC data flow; and
   transmitting the one or more characteristics of the WebRTC interactive flow comprises:
      establishing the WebRTC data flow between the acquisition agent and the correlation agent; and
      transmitting the one or more characteristics of the WebRTC interactive flow via the WebRTC data flow.

16. The non-transitory computer-readable medium of claim 12 having stored thereon the computer-executable instructions to cause the processor to implement the method, wherein the second data communication session comprises communication via Hyper Text Transfer Protocol (HTTP), Hyper Text Transport Protocol Secure (HTTPS), WebSockets, or combinations thereof.

17. The non-transitory computer-readable medium of claim 12 having stored thereon the computer-executable instructions to cause the processor to implement the method, wherein the one or more interaction records comprise a call description record, a call detail record, or a transaction record.

* * * * *